US007070003B1

(12) United States Patent
Smith

(10) Patent No.: US 7,070,003 B1
(45) Date of Patent: Jul. 4, 2006

(54) CANISTER FIRE EXTINGUISHING ASSEMBLY

(76) Inventor: Linda M. Smith, 277 Chelsea Pl., Buffalo, NY (US) 14215

( * ) Notice: Subject to any disclaimer, the term of this patent is extended or adjusted under 35 U.S.C. 154(b) by 118 days.

(21) Appl. No.: 10/768,893

(22) Filed: Feb. 2, 2004

(51) Int. Cl.
*A62C 37/00* (2006.01)
*A62C 37/10* (2006.01)
*A62C 13/62* (2006.01)
*A01G 27/00* (2006.01)

(52) U.S. Cl. ............................ 169/66; 169/54; 169/60; 169/64; 169/69; 169/16; 239/67; 239/69

(58) Field of Classification Search .................. 169/66, 169/54, 60, 69, 64, 16; 239/600, 67, 69
See application file for complete search history.

(56) References Cited

U.S. PATENT DOCUMENTS

| | | | | |
|---|---|---|---|---|
| 1,325,769 | A | | 12/1919 | Welch |
| 2,917,116 | A | | 12/1959 | Wyant |
| 3,206,061 | A | | 9/1965 | Feldman |
| 3,489,223 | A | | 1/1970 | Bundo, Sr. |
| 3,536,139 | A | * | 10/1970 | Bruckner et al. ............. 169/26 |
| 3,741,309 | A | * | 6/1973 | McCulloch .................. 169/59 |
| 3,796,267 | A | | 3/1974 | Hunter et al. |
| 3,820,607 | A | | 6/1974 | Miloy |
| 4,013,127 | A | | 3/1977 | Tenney et al. |
| 4,250,967 | A | | 2/1981 | Horwinski et al. |
| 4,394,868 | A | * | 7/1983 | McLelland ............... 137/68.13 |
| 4,411,318 | A | | 10/1983 | Zeischegg et al. |
| 4,664,199 | A | * | 5/1987 | Grant et al. .................. 169/46 |
| 4,781,252 | A | * | 11/1988 | Wilburn et al. ............... 169/68 |
| 4,838,356 | A | * | 6/1989 | Akatsu ........................ 169/66 |
| 5,056,603 | A | | 10/1991 | Parkinson |
| 5,090,482 | A | * | 2/1992 | Baron et al. .................. 169/46 |
| 5,361,847 | A | | 11/1994 | Phelps |
| D376,235 | S | | 12/1996 | Presnell |
| D453,600 | S | | 2/2002 | Lin |

* cited by examiner

*Primary Examiner*—Davis Hwu

(57) ABSTRACT

A canister fire extinguishing assembly includes a device that is adapted for removably coupling to a fire extinguisher. The device includes a container that has a bottom wall and a peripheral wall that is attached to and extends upwardly from the bottom wall. The peripheral wall has an upper edge. A mounting is attached to an outer surface of the peripheral wall for removably mounting the fire extinguisher to the container. A valve actuating assembly is removably coupled to the extinguisher. The valve actuating assembly is adapted for actuating a valve of the fire extinguisher and for directing pressurized fire extinguishing composition therein into the container when smoke is detected within the container or a temperature of greater than 50° C. is detected.

13 Claims, 4 Drawing Sheets

CANISTER FIRE EXTINGUISHING ASSEMBLY

BACKGROUND OF THE INVENTION

1. Field of the Invention

The present invention relates to refuse bin fire extinguishing devices and more particularly pertains to a new refuse bin fire extinguishing device for automatically extinguishing a fire in a trashcan.

2. Description of the Prior Art

The use of refuse bin fire extinguishing devices is known in the prior art. U.S. Pat. No. 3,489,223 describes a device that includes a receptacle having a plurality of apertures that extends into a compartment positioned between inner and outer shells. A fire extinguishing composition is injected into the compartment and outwardly through the apertures to put out a fire within the receptacle. Another type of refuse bin fire extinguishing device is U.S. Pat. No. 1,325,769 which includes a receptacle having a built in fire extinguishing means which is activate upon the addition of that.

While these devices fulfill their respective, particular objectives and requirements, the need remains for a device that provides for the addition of a waste bag without interfering with the fire suppressing abilities of the trash receptacle. The device should be activated not only by an elevated temperature but also if there is the presence of smoke within the receptacle.

SUMMARY OF THE INVENTION

The present invention meets the needs presented above by generally comprising a device that is adapted for removably coupling to a fire extinguisher. The device includes a container that has a bottom wall and a peripheral wall that is attached to and extends upwardly from the bottom wall. The peripheral wall has an upper edge. A mounting is attached to an outer surface of the peripheral wall for removably mounting the fire extinguisher to the container. A valve actuating assembly is removably coupled to the extinguisher. The valve actuating assembly is adapted for actuating a valve of the fire extinguisher and for directing pressurized fire extinguishing composition therein into the container when smoke is detected within the container or a temperature of greater than 50° C. is detected.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
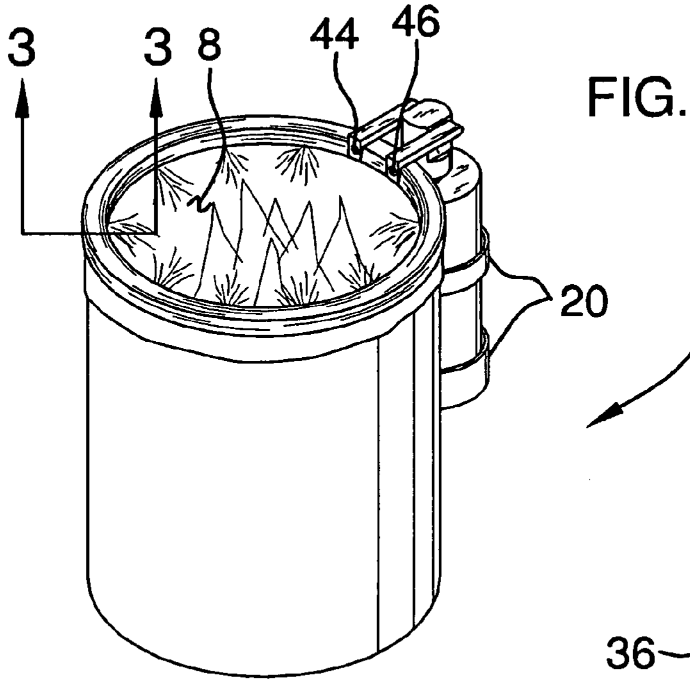
FIG. 1 is a schematic perspective view of a canister fire extinguishing assembly according to the present invention.
Figure 2:
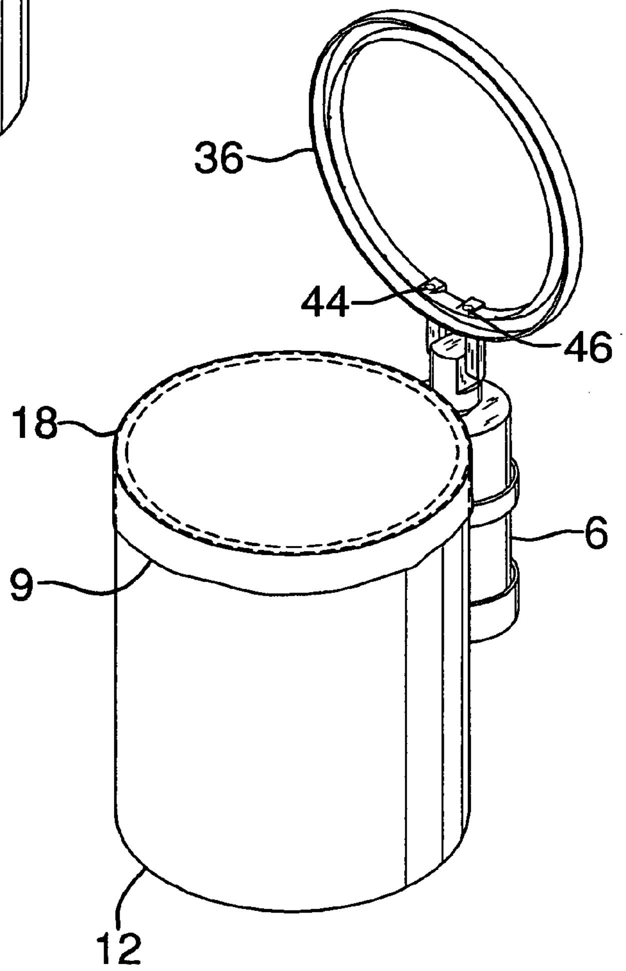
FIG. 2 is a schematic perspective view of the present invention.
Figure 3:
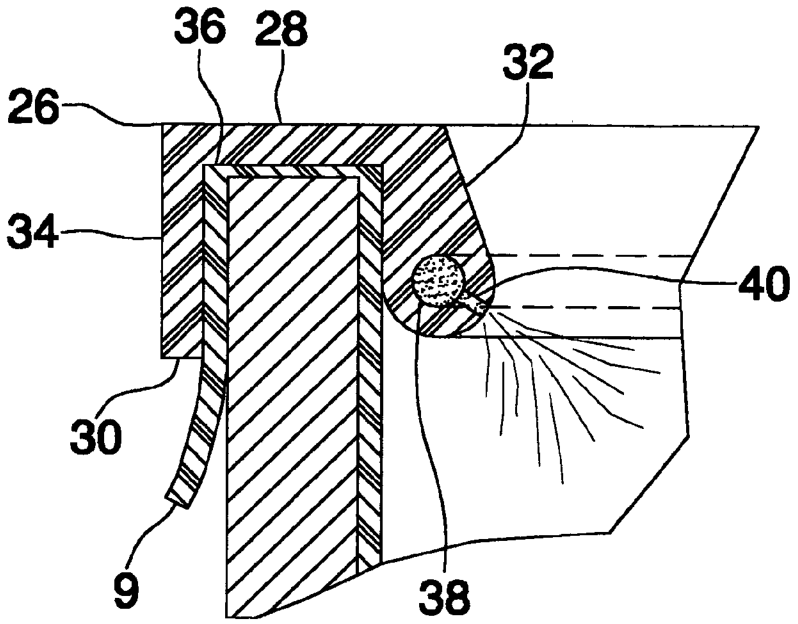
FIG. 3 is a schematic cross-sectional view of the loop member of the present invention taken along line 3—3 of FIG. 1.
Figure 4:
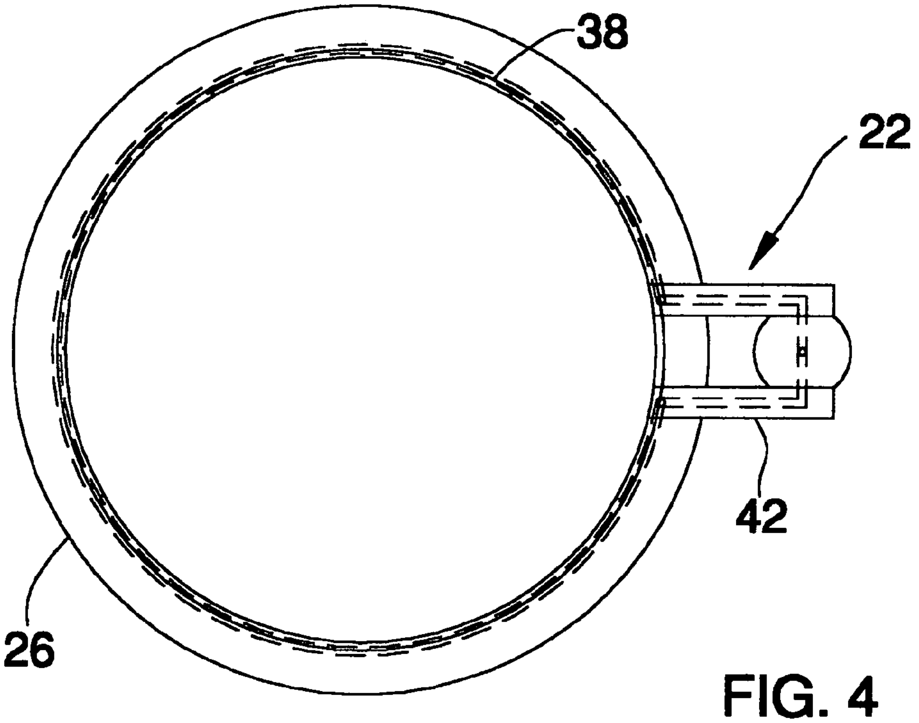
FIG. 4 is a schematic top view of the loop member of the present invention.
Figure 5:
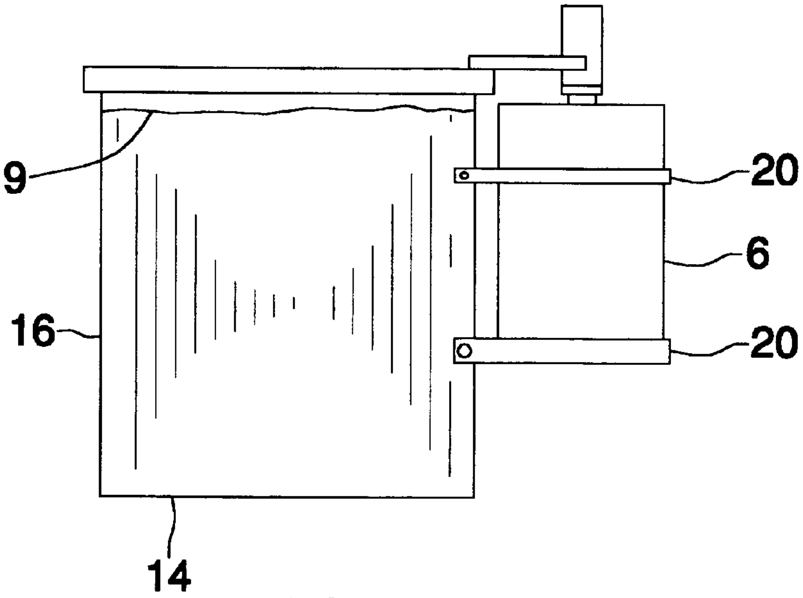
FIG. 5 is a schematic side view of the present invention.
Figure 6:
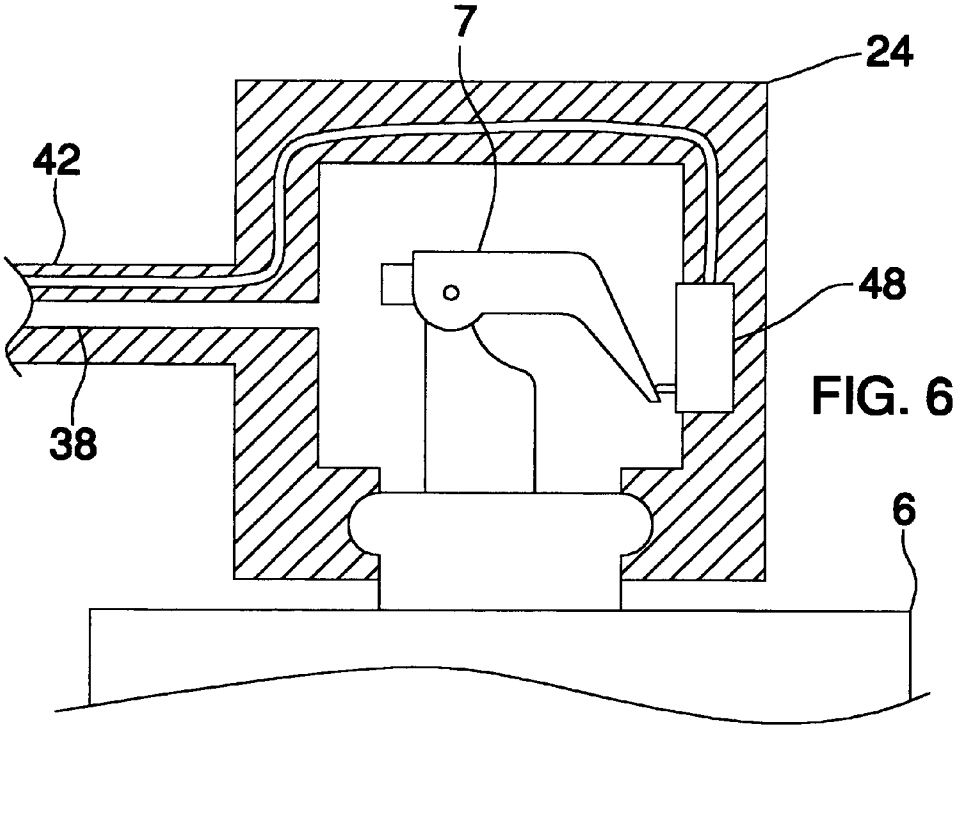
FIG. 6 is a schematic cross-sectional view of the cover of the present invention.
Figure 7:
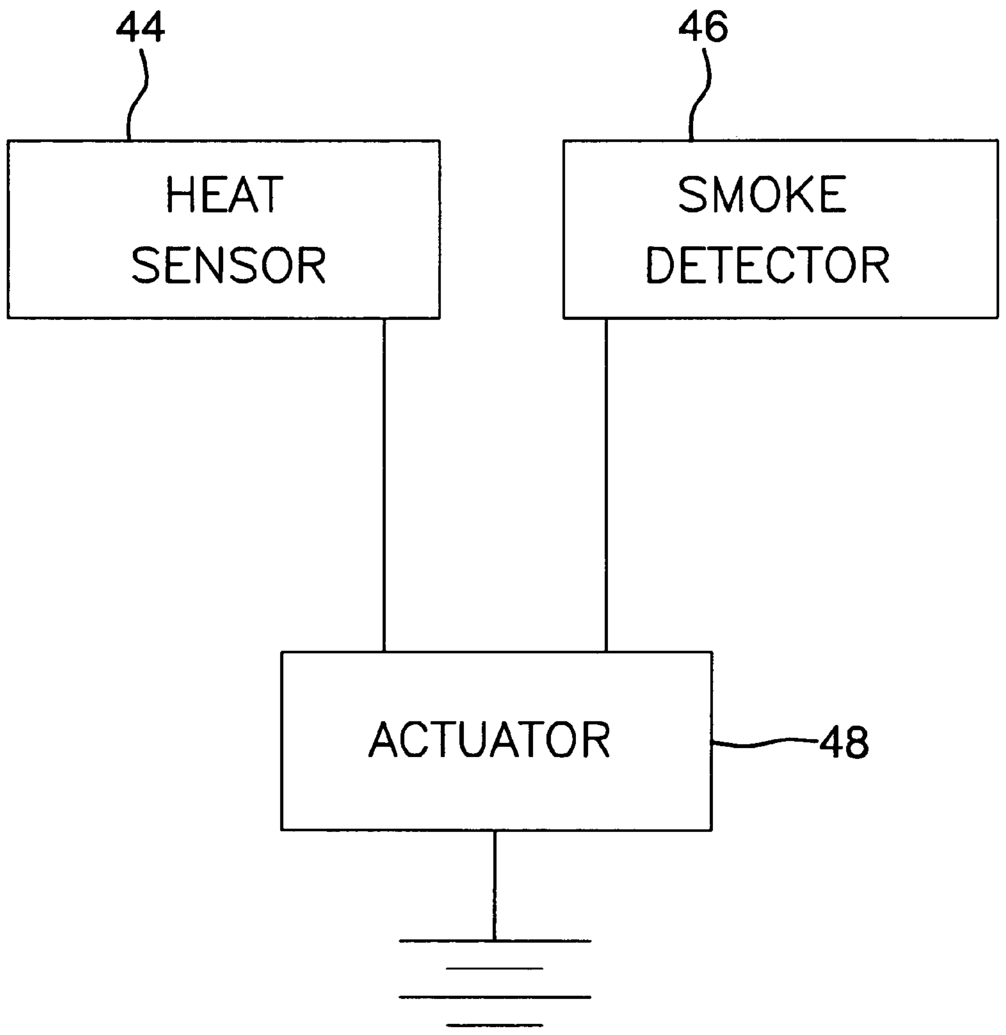
FIG. 7 is a schematic view of the present invention.

With reference now to the drawings, and in particular to FIGS. 1 through 7 thereof, a new refuse bin fire extinguishing device embodying the principles and concepts of the present invention and generally designated by the reference numeral 10 will be described.

As best illustrated in FIGS. 1 through 7, the canister fire extinguishing assembly 10 includes a device that is adapted for removably coupling to a fire extinguisher 6. The device 10 generally comprises a container 12 having a bottom wall 14 and a peripheral wall 16 that is attached to and extends upwardly from the bottom wall 14. The peripheral wall 14 has an upper edge 18. The container 12 is used as a refuse container and may be either cylindrical or rectangular in shape.

A mounting 20 is attached to an outer surface of the peripheral wall 16. The mounting 20 is adapted for removably mounting the fire extinguisher 6 to the container 12. The mounting 20 preferably includes one or more rings for securing the extinguisher 6 to the peripheral wall 16.

A valve actuating assembly 22 is removably coupled to the extinguisher 6. The valve actuating assembly 22 is adapted for actuating a valve 7 of the fire extinguisher 6 and for directing the pressurized fire extinguishing composition 8 therein into the container 12. The valve actuating assembly 22 actuates the valve 7 when smoke is detected within the container 12 or a temperature of greater than 50° C. is detected.

The valve actuating assembly 22 includes a cover 24 that is removably positioned over the valve 7. The cover 24 may be secured to the extinguisher 6 with a snapping mechanism or with a threaded coupling mechanism. A loop member 26 has an upper side 28, a lower side 30, an inner side 32 and an outer side 34. The lower side 30 has a slot 36 therein extending along the inner side 32. The loop member 26 has a shape substantially identical to the upper edge 18 such that the upper edge 18 may be selectively inserted into the slot 36. The loop member 26 has an interior channel 38 therein extending along a length of the loop member 26 and is positioned between the inner side 32 and the slot 36. The inner side 32 has a plurality of apertures 40 therein extending into the channel 38. Each of the apertures 40 is angled downwardly into the container 12 when the upper edge 18 is positioned within the slot 36.

An arm assembly 42 is attached to and extends away from the outer side 34 of the loop member 26. The arm assembly 42 is pivotally coupled to the cover 24. The interior channel 38 extends through the arm assembly 42 and is in fluid connection with an interior of the cover 24. A heat sensor 44 is mounted on the inner side 32 of the loop member 26 and is adapted for detecting a temperature greater than 50° C. A smoke detector 46 for detecting smoke is also mounted on the inner side 32 of the loop member 26. An actuator 48 is mounted in the cover 24 and is adapted for selectively actuating opening the valve 7. The actuator 48 is electrically coupled to the heat sensor 44 and the smoke detector 46 for opening the valve 7 when the heat sensor 44 detects a temperature greater than 50° C. or the smoke detector 46 detects smoke.

In use, the device 10 is used as a conventional trash can. The loop member 26 may be lifted upwardly away from the upper edge 18 as needed in order to place garbage bags 9 within the container 12. The upper edge 18 is then placed in the slot 36 to hold the garbage bag 9 on the container 12. If an item is burning within container 12, either the heat sensor 44 will detect the heat or the smoke detector 46 will detect smoke so that the actuator 48 engages the valve 7 and releases the fire extinguishing material from the fire extinguisher 6. The fire extinguishing composition 8, such as carbon dioxide, will travel through the channel 38 and outwardly-through the apertures 40.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A fire extinguisher actuating and refuse container combination device, said device being adapted for removably coupling to a fire extinguisher, said device comprising:

a container having a bottom wall and a peripheral wall being attached to and extending upwardly from said bottom wall, said peripheral wall having an upper edge;

a mounting being attached to an outer surface of said peripheral wall for removably mounting the fire extinguisher to the container;

a valve actuating assembly being removably coupled to said extinguisher, said valve actuating assembly being adapted for actuating a valve of the fire extinguisher and directing pressurized fire extinguishing composition therein into said container when smoke is detected within said container or a temperature of greater than 50° C. is detected, said valve actuating assembly including;

a cover being removably being positioned over the valve;

a loop member having an upper side, a lower side, an inner side and an outer side, said loop member having an interior channel therein extending along a length of said loop member, said inner side having a plurality of apertures therein extending into said channel, each of said apertures being angled downwardly into said container when said upper edge is positioned within said slot;

an arm assembly being attached to and extending away from said outer side of said loop member, said arm assembly being pivotally coupled to said cover, said interior channel extending through said arm assembly and being in fluid connection with an interior of said cover.

2. The device of claim 1, wherein said lower side of said loop member has a slot therein extending along said inner side, said loop member having a shape substantially identical to said upper edge such that said upper edge may be selectively inserted into said slot, said channel being positioned between said inner side and said slot.

3. The device of claim 2, further including a heat sensor being mounted on said inner side of said loop member and being adapted for detecting a temperature greater than 50° C., a smoke detector being mounted on said inner side of said loop member.

4. The device of claim 3, further including an actuator being mounted in said cover and being adapted for selectively opening said valve, said actuator being electrically coupled to said heat sensor and said smoke detector for opening said valve when said heat sensor detects a temperature greater than 50° C. or said smoke detector detects smoke.

5. The device of claim 1, further including a heat sensor being mounted of said inner side of said loop member and being adapted for detecting a temperature greater than 50° C., a smoke detector being mounted on said inner side of said loop member.

6. The device of claim 5, further including an actuator being mounted in said cover and being adapted for selectively opening said valve, said actuator being electrically coupled to said heat sensor and said smoke detector for opening said valve when said heat sensor detects a temperature greater than 50° C. or said smoke detector detects smoke.

7. The device of claim 1, wherein said lower side of said loop member has a slot therein extending along said inner side, said loop member having a shape substantially identical to said upper edge such that said upper edge may be selectively inserted into said slot, said channel being positioned between said inner side and said slot.

8. The device of claim 7, further including a heat sensor being mounted on said inner side of said loop member and being adapted for detecting a temperature greater than 50° C., a smoke detector being mounted on said inner side of said loop member.

9. The device of claim 8, further including an actuator being mounted in said cover and being adapted for selectively opening said valve, said actuator being electrically coupled to said heat sensor and said smoke detector for opening said valve when said heat sensor detects a temperature greater than 50° C. or said smoke detector detects smoke.

10. The device of claim 8, further including a heat sensor being mounted on said inner side of said loop member and being adapted for detecting a temperature greater than 50° C., a smoke detector being mounted on said inner side of said loop member.

11. The device of claim 10, further including an actuator being mounted in said cover and being adapted for selectively opening said valve, said actuator being electrically coupled to said heat sensor and said smoke detector for opening said valve when said heat sensor detects a temperature greater than 50° C. or said smoke detector detects smoke.

12. A fire extinguisher actuating and refuse container combination device, said device being adapted for removably coupling to a fire extinguisher, said device comprising:

a container having a bottom wall and a peripheral wall being attached to and extending upwardly from said bottom wall, said peripheral wall having an upper edge;

a mounting being attached to an outer surface of said peripheral wall for removably mounting the fire extinguisher to the container;

a valve actuating assembly being removably coupled to said extinguisher, said valve actuating assembly being adapted for actuating a valve of the fire extinguisher and directing pressurized fire extinguishing composition therein into said container when smoke is detected within said container or a temperature of greater than 50° C. detected, said valve actuating assembly including;

a cover being removably being positioned over the valve;

a loop member having an upper side, a lower side, an inner side and an outer side, said lower side having a slot therein extending along said inner side, said loop member having a shape substantially identical to said upper edge such that said upper edge may be selectively inserted into said slot, said loop member having an interior channel therein extending along a length of said loop member and being positioned between said inner side and said slot, said inner side having a plurality of apertures therein extending into said channel, each of said apertures being angled downwardly into said container when said upper edge is positioned within said slot;

an arm assembly being attached to and extending away from said outer side of said loop member, said arm assembly being pivotally coupled to said cover, said interior channel extending through said arm assembly and being in fluid connection with an interior of said cover;

a heat sensor being mounted on said inner side of said loop member and being adapted for detecting a temperature greater than 50° C.;

a smoke detector being mounted on said inner side of said loop member; and an actuator being mounted in said cover and being adapted for selectively opening said valve, said actuator being electrically coupled to said heat sensor and said smoke detector for opening said valve when said heat sensor detects a temperature greater than 50° C. or said smoke detector detects smoke.

13. A fire extinguisher actuating and refuse container combination system, said system comprising:

a fire extinguisher including a canister and a valve, said valve being configured to selectively dispense a pressurized fire extinguishing composition contents contained within said canister of said fire extinguisher;

a container having a bottom wall and a peripheral wall being attached to and extending upwardly from said bottom wall, said peripheral wall having an upper edge;

a mounting being attached to an outer surface of said peripheral wall and being configured to removably mount said fire extinguisher to said container; and a valve actuating assembly being removably coupled to said fire extinguisher, said valve actuating assembly being configured to actuate said valve of said fire extinguisher and direct the pressurized fire extinguishing composition therein into said container when smoke is detected within said container or a temperature of greater than 50° C. is detected, said valve actuating assembly including:

a cover being removably being positioned over the valve;

a loop member having an upper side, a lower side, an inner side and an outer side, said loop member having an interior channel therein extending along a length of said loop member, said inner side having a plurality of apertures therein extending into said channel, each of said apertures being angled downwardly into said container when said upper edge is positioned within said slot;

an arm assembly being attached to and extending away from said outer side of said loop member, said arm assembly being pivotally coupled to said cover, said interior channel extending through said arm assembly and being in fluid connection with an interior of said cover.

* * * * *